(12) United States Patent
Davidchuk et al.

(10) Patent No.: US 11,176,130 B2
(45) Date of Patent: Nov. 16, 2021

(54) DERIVATION OF A QUERY BASED ON FILTER CRITERIA

(71) Applicant: salesforce.com, inc., San Francisco, CA (US)

(72) Inventors: Matthew Francis Davidchuk, Seattle, WA (US); Qian Bai, Pleasanton, CA (US); Alex Ye, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 50 days.

(21) Appl. No.: 16/738,572

(22) Filed: Jan. 9, 2020

(65) Prior Publication Data
US 2021/0216546 A1 Jul. 15, 2021

(51) Int. Cl.
G06F 16/245 (2019.01)
G06F 16/2453 (2019.01)
G06F 16/2455 (2019.01)

(52) U.S. Cl.
CPC .. G06F 16/24534 (2019.01); G06F 16/24553 (2019.01)

(58) Field of Classification Search
None
See application file for complete search history.

(56) References Cited

U.S. PATENT DOCUMENTS

| | | | |
|---|---|---|---|
| 5,737,726 A * | 4/1998 | Cameron | G06F 16/24534 707/999.001 |
| 7,730,478 B2 | 6/2010 | Weissman | |
| 7,779,039 B2 | 8/2010 | Weissman et al. | |
| 8,560,554 B2 | 10/2013 | Gradin et al. | |
| 8,560,575 B2 | 10/2013 | Gradin et al. | |
| 8,732,150 B2 | 5/2014 | Gradin et al. | |
| 8,892,573 B2 | 11/2014 | Gradin et al. | |
| 9,367,643 B2 | 6/2016 | Gradin et al. | |
| 9,830,340 B2 | 11/2017 | Gradin et al. | |
| 9,940,411 B2 | 4/2018 | Davidchuk et al. | |
| 10,031,730 B2 | 7/2018 | Davidchuk et al. | |
| 10,198,484 B2 | 2/2019 | Hausler et al. | |
| 10,430,765 B2 | 10/2019 | Hausler et al. | |
| 10,452,244 B2 | 10/2019 | Davidchuk et al. | |
| 2007/0192283 A1 * | 8/2007 | Larson | G06F 16/2453 |
| 2008/0195649 A1 * | 8/2008 | Lefebvre | G06F 16/252 |
| 2008/0263471 A1 * | 10/2008 | Hooper | G06F 16/58 707/E17.026 |
| 2013/0309648 A1 * | 11/2013 | Park | G06F 16/24534 |

(Continued)

*Primary Examiner* — Son T Hoang
(74) *Attorney, Agent, or Firm* — Haynes and Boone, LLP

(57) ABSTRACT

A method is provided for deriving different queries from the same filter criteria. The method includes receiving filter criteria specifying a condition for a set of first objects. The method includes generating a first query specifying a selection from the set of first objects based on the filter criteria, causing a result set of the first query to be displayed using a list-related view, and receiving a request to switch from the list-related view to a calendar-related view. The method includes in response to receiving the request, determining a foreign key for the set of first objects, the foreign key being a primary key for a set of second objects. The method includes generating a second query specifying a selection from the set of second objects based on the filter criteria and causing a result set of the second query to be displayed using the calendar-related view.

20 Claims, 15 Drawing Sheets

(56) References Cited

U.S. PATENT DOCUMENTS

| | | | |
|---|---|---|---|
| 2014/0019564 A1 | 1/2014 | Ye et al. | |
| 2016/0300204 A1* | 10/2016 | Guido | G06F 16/24553 |
| 2018/0150482 A1 | 5/2018 | Gradin et al. | |
| 2018/0307466 A1 | 10/2018 | Davidchuk et al. | |

* cited by examiner

FIG. 5

| | Job Profile | Status | Start Time | End Time | Service Resource |
|---|---|---|---|---|---|
| 1 | Electrician | Tentative | 12/19/2019 12:00 PM | 12/19/2019 11:30 PM | John Smith |
| 2 | | Tentative | 12/19/2019 6:00 PM | 12/19/2019 11:30 PM | |
| 3 | Electrician | Confirmed | 12/18/2019 8:30 AM | 12/18/2019 4:30 PM | John Smith |
| 4 | Dispatch | Tentative | 12/19/2019 8:30 AM | 12/19/2019 4:30 PM | |
| 5 | | Tentative | 12/17/2019 8:30 PM | 12/18/2019 4:30 AM | |
| 6 | | Tentative | 12/16/2019 7:00 AM | 12/16/2019 5:00 PM | Bob Li |
| 7 | | | 12/16/2019 4:30 PM | 12/16/2019 11:30 PM | |
| 8 | Plumber | Tentative | 12/18/2019 8:30 AM | 12/18/2019 4:30 PM | Leslie Chan |
| 9 | Dispatch | Tentative | 12/18/2019 5:30 PM | 12/18/2019 11:30 PM | Nara Kim |
| 10 | | Tentative | 12/17/2019 7:30 AM | 12/18/2019 4:30 PM | |

Filter dialog:
- Field: Service Resource
- Operator: contains — 502
- Value: Smith
- User-Selectable "Done" Option 506
- Add Filter — 406
- Remove All
- Filter by Owner: All Shifts
- Cancel / Save Filter Input Box 404

FIG. 7

FIG. 8

DERIVATION OF A QUERY BASED ON FILTER CRITERIA

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to a computing device, and more specifically to systems and methods for deriving a query based on filter criteria.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Computer and software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" supplied by an infrastructure provider. The infrastructure provider typically abstracts the underlying hardware and other resources used to deliver a user-developed application so that a user (e.g., consumer of cloud-based services) no longer needs to operate and support dedicated server hardware. The cloud computing model can often provide substantial cost savings to the user over the life of the application because the user no longer needs to provide dedicated network infrastructure, electrical and temperature controls, physical security and other logistics in support of dedicated server hardware.

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.). In one example, the cloud platform may support customer relationship management (CRM) solutions. This may include support for sales, service, marketing, community, analytics, applications, and the Internet of Things (IoT).

BRIEF DESCRIPTION OF THE DRAWINGS

FIGS. 4-8 illustrate user interfaces (UIs) according to some embodiments.

Figure 1:
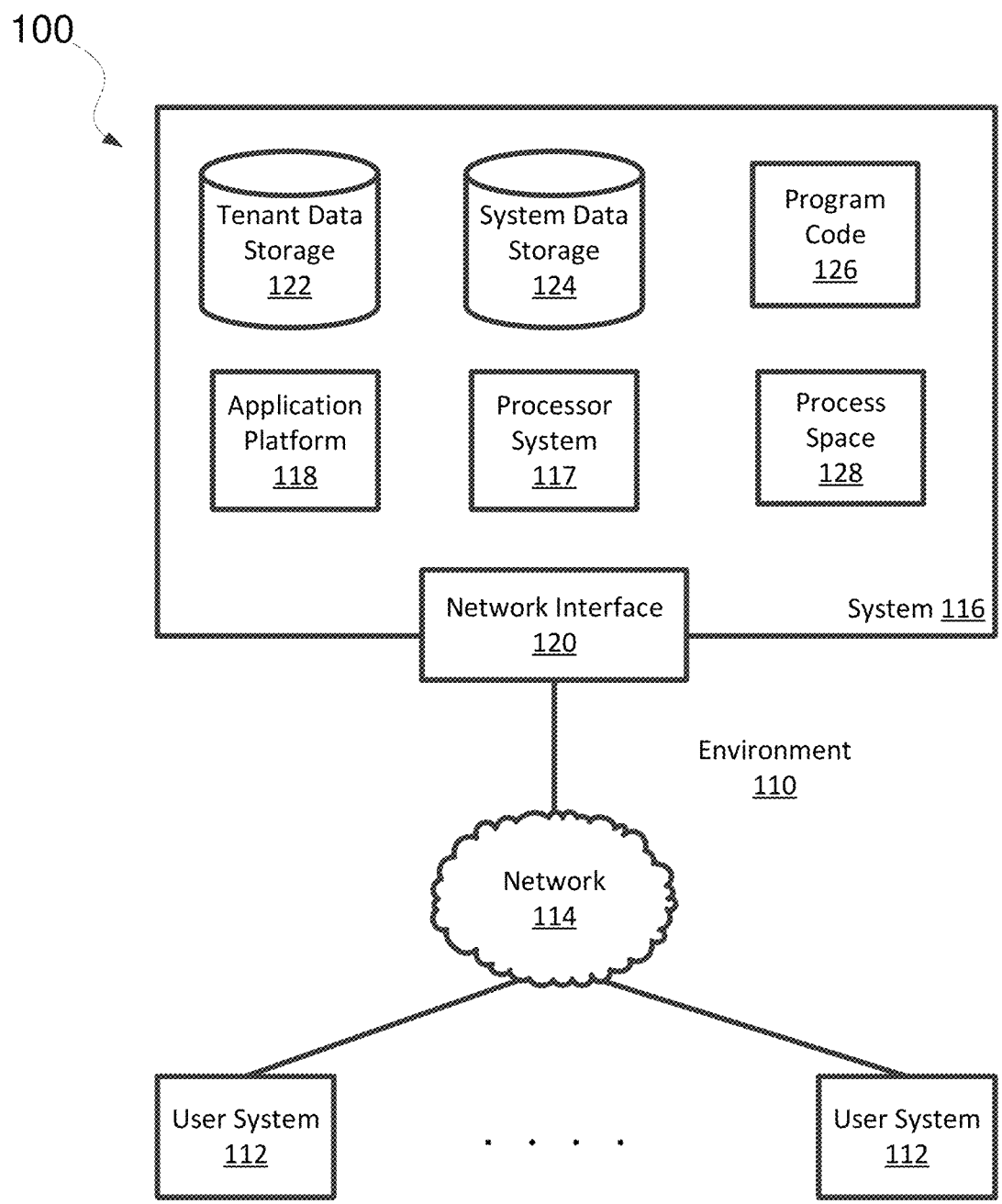
FIG. 1 illustrates a block diagram of an example environment according to some embodiments.

In the figures, elements having the same designations have the same or similar functions.

I. Example Environment
II. Retrieve Data from a Database
   A. The User Transmits Filter Criteria Via a User Interface (UI) for Processing
   B. Derivation of a Query Specific to a List-related View
   C. Derivation of a Query Specific to a Calendar-related View
   D. Context Associated with More than One Foreign Key
III. Operational Flow

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

I. Example Environment

The system and methods of the present disclosure can include, incorporate, or operate in conjunction with or in the environment of a database, which in some embodiments can be implemented as a multi-tenant, cloud-based architecture. Multi-tenant cloud-based architectures have been developed to improve collaboration, integration, and community-based cooperation between customer tenants without sacrificing data security. Generally speaking, multi-tenancy refers to a system where a single hardware and software platform simultaneously support multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost-effective sharing of similar application features between multiple sets of users.

FIG. 1 illustrates a block diagram of an example environment 110 according to some embodiments. Environment 110 may include user systems 112, network 114, system 116, processor system 117, application platform 118, network interface 120, tenant data storage 122, system data storage 124, program code 126, and process space 128 for executing database system processes and tenant-specific processes, such as running applications as part of an application hosting service. In other embodiments, environment 110 may not have all of the components listed and/or may have other elements instead of, or in addition to, those listed above.

In some embodiments, the environment 110 is an environment in which an on-demand database service exists. A user system 112 may be any machine or system that is used by a user to access a database user system. For example, any of user systems 112 can be a handheld computing device, a mobile phone, a laptop computer, a notepad computer, a work station, and/or a network of computing devices. As illustrated in FIG. 1 (and in more detail in FIG. 2) user systems 112 might interact via a network 114 with an on-demand database service, which is system 116.

An on-demand database service, such as that which can be implemented using the system 116, is a service that is made available to users outside of the enterprise(s) that own, maintain or provide access to the system 116. As described above, such users do not need to necessarily be concerned with building and/or maintaining the system 116. Instead, resources provided by the system 116 may be available for such users' use when the users need services provided by the system 116—e.g., on the demand of the users. Some on-demand database services may store information from one or more tenants into tables of a common database image to form a multi-tenant database system (MTS). Accordingly, the "on-demand database service 116" and the "system 116" will be used interchangeably herein. The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image may include one or more database objects. A relational database management system (RDBMS) or the equivalent may execute storage and retrieval of information against the database object(s).

The application platform 118 may be a framework that allows the applications of system 116 to run, such as the hardware and/or software infrastructure, e.g., the operating system. In an embodiment, on-demand database service 116 may include an application platform 118 that enables creating, managing, and executing one or more applications developed by the provider of the on-demand database service, users accessing the on-demand database service via user systems 112, or third-party application developers accessing the on-demand database service via user systems 112.

The users of user systems 112 may differ in their respective capacities, and the capacity of a particular user system 112 might be entirely determined by permissions (permission levels) for the current user. For example, where a salesperson is using a particular user system 112 to interact with system 116, that user system has the capacities allotted to that salesperson. However, while an administrator is using that user system 112 to interact with system 116, that user system 112 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 114 is any network or combination of networks of devices that communicate with one another. For example, the network 114 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the "Internet" with a capital "I," that network will be used in many of the examples herein. However, it should be understood that the networks that the present embodiments might use are not so limited, although TCP/IP is a frequently implemented protocol.

The user systems 112 might communicate with system 116 using TCP/IP and, at a higher network level, use other common Internet protocols to communicate, such as hypertext transfer protocol (HTTP), file transfer protocol (FTP), Andrew file system (AFS), wireless application protocol (WAP), etc. In an example where HTTP is used, user system 112 might include an HTTP client commonly referred to as a "browser" for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least for the users that are accessing that server, each of the plurality of servers has access to the MTS data; however, other alternative configurations may be used instead.

In some embodiments, the system 116, shown in FIG. 1, implements a web-based customer relationship management (CRM) system. For example, in one embodiment, system 116 includes application servers configured to implement and execute CRM software applications as well as provide related data, code, forms, webpages and other information to and from user systems 112 and to store to, and retrieve from, a database system related data, objects, and web page content. With a MTS, data for multiple tenants may be stored in the same physical database object. However, tenant data typically is arranged so that data of one tenant is kept logically separate from that of other tenants so that one tenant does not have access to another tenant's data, unless such data is expressly shared. In certain embodiments, the system 116 implements applications other than, or in addition to, a CRM application. For example, system 116 may provide tenant access to multiple hosted (standard and custom) applications, including a CRM application. User (or third-party developer) applications, which may or may not include CRM, may be supported by the application platform 118, which manages creation, storage of the applications into one or more database objects, and execution of the applications in a virtual machine in the process space of the system 116.

One arrangement for elements of the system 116 is shown in FIG. 1, including the network interface 120, the application platform 118, the tenant data storage 122 for tenant data 123, the system data storage 124 for system data 125 accessible to system 116 and possibly multiple tenants, the program code 126 for implementing various functions of the system 116, and the process space 128 for executing MTS system processes and tenant-specific processes, such as running applications as part of an application hosting service. Additional processes that may execute on system 116 include database indexing processes.

Several elements in the system shown in FIG. 1 include conventional, well-known elements that are explained only briefly here. For example, each of the user systems 112 could include a desktop personal computer, workstation, laptop, notepad computer, personal digital assistant (PDA), cellphone, or any wireless access protocol (WAP) enabled device or any other computing device capable of interfacing directly or indirectly to the Internet or other network connection. Each of the user systems 112 typically runs an HTTP client, e.g., a browsing program, such as Microsoft's Internet Explorer browser, Netscape's Navigator browser, Opera's browser, or a WAP-enabled browser in the case of a cell phone, notepad computer, PDA or other wireless device, or the like, allowing a user (e.g., subscriber of the MTS) of the user systems 112 to access, process, and view information, pages, and applications available to it from the system 116 over the network 114. Each of the user systems 112 also typically includes one or more user interface devices, such as a keyboard, mouse, trackball, touch pad, touch screen, pen or the like, for interacting with a graphical user interface (GUI) provided by the browser on a display (e.g., a monitor screen, liquid crystal display (LCD) monitor, light emitting diode (LED) monitor, organic light emitting diode (OLED) monitor, etc.) in conjunction with pages, forms, applications, and other information provided by the system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 112 and all of its components are operator configurable using applications, such as a browser, including computer code run using a central processing unit (CPU) such as an Intel Pentium® processor or the like. Similarly, system 116 (and additional instances of an MTS, where more than one is present) and all of their components might be operator configurable using application(s) including computer code to run using a CPU such as the processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 116 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a read-only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun MicroSystems, Inc.).

According to one embodiment, the system 116 is configured to provide webpages, forms, applications, data and media content to the user (client) systems 112 to support the access by the user systems 112 as tenants of the system 116. As such, the system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., object-oriented database management system (OODBMS) or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
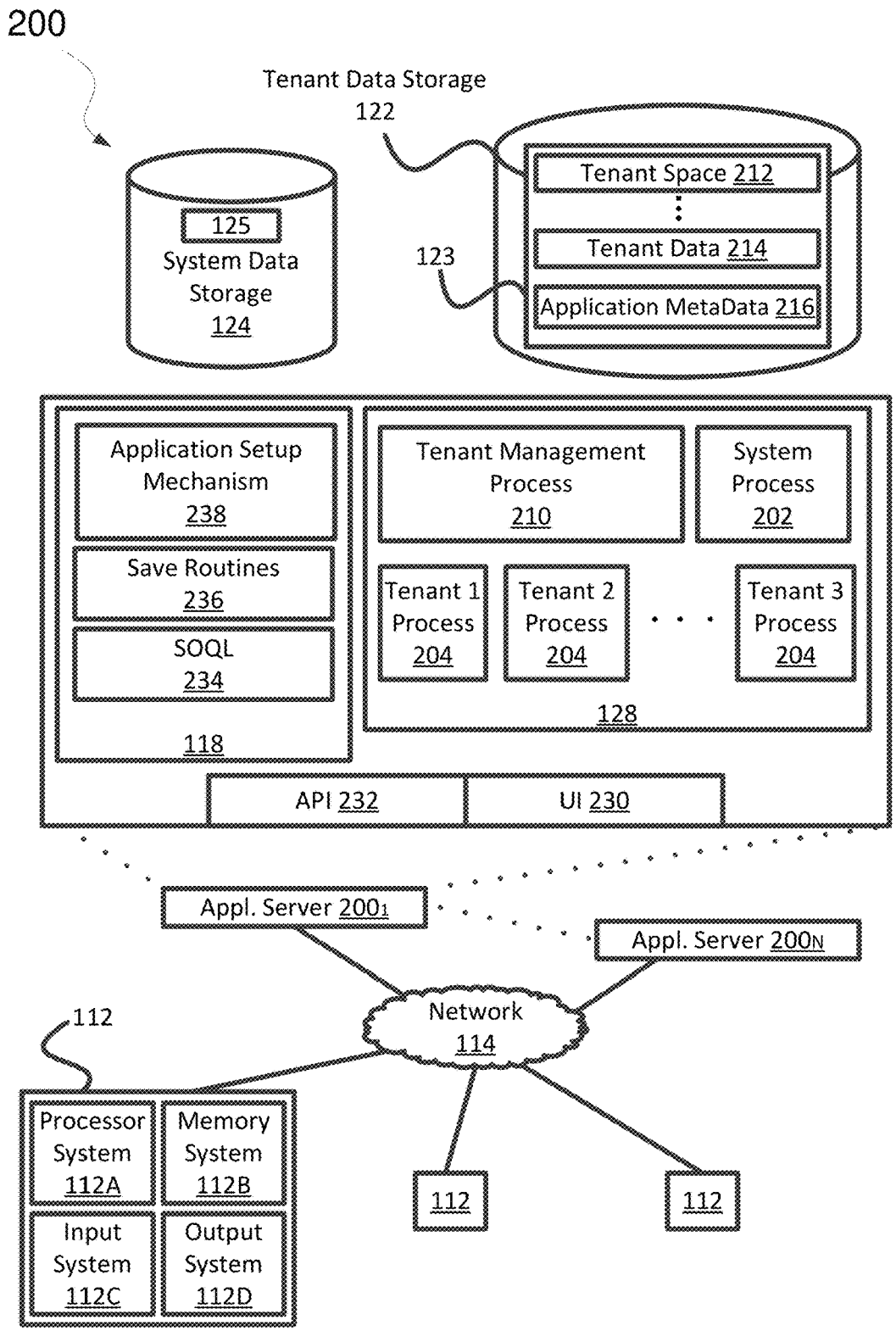
FIG. 2 illustrates a block diagram of another example environment according to some embodiments.

FIG. 2 also illustrates the environment 110, which may be used to implement embodiments described herein. FIG. 2 further illustrates elements of system 116 and various interconnections, according to some embodiments. FIG. 2 shows that each of the user systems 112 may include a processor system 112A, a memory system 112B, an input system 112C, and an output system 112D. FIG. 2 shows the network 114 and the system 116. FIG. 2 also shows that the system 116 may include the tenant data storage 122, the tenant data 123, the system data storage 124, the system data 125, a user interface (UI) 230, an application program interface (API) 232, a Salesforce.com object query language (SOQL) 234, save routines 236, an application setup mechanism 238, applications servers $200_1$-$200_N$, a system process space 202, tenant process spaces 204, a tenant management process space 210, a tenant storage area 212, a user storage 214, and application metadata 216. In other embodiments, environment 110 may not have the same elements as those listed above and/or may have other elements instead of, or in addition to, those listed above.

The user systems 112, the network 114, the system 116, the tenant data storage 122, and the system data storage 124 were discussed above in FIG. 1. Regarding the user systems 112, the processor system 112A may be any combination of one or more processors. The memory system 112B may be any combination of one or more memory devices, short-term, and/or long-term memory. The input system 112C may be any combination of input devices, such as one or more keyboards, mice, trackballs, scanners, cameras, and/or interfaces to networks. The output system 112D may be any combination of output devices, such as one or more monitors, printers, and/or interfaces to networks. As shown in FIGS. 1 and 2, the system 116 may include the network interface 120 (of FIG. 1) implemented as a set of HTTP application servers 200, the application platform 118, the tenant data storage 122, and the system data storage 124. Also shown is system process space 202, including individual tenant process spaces 204 and the tenant management process space 210. Each application server 200 may be configured to access the tenant data storage 122 and the tenant data 123 therein, and the system data storage 124 and the system data 125 therein to serve requests of the user systems 112. The tenant data 123 may be divided into individual tenant storage areas 212, which can be either a physical arrangement and/or a logical arrangement of data. Within each tenant storage area 212, the user storage 214 and the application metadata 216 may be similarly allocated for each user. For example, a copy of a user's most recently used (MRU) items might be stored to the user storage 214. Similarly, a copy of MRU items for an entire organization that is a tenant might be stored to the tenant storage area 212. The UI 230 provides a user interface and the API 232 provides an application programmer interface to the system 116 resident processes and to users and/or developers at the user systems 112. The tenant data and the system data may be stored in various databases, such as one or more Oracle™ databases.

The application platform 118 includes an application setup mechanism 238 that supports application developers' creation and management of applications, which may be saved as metadata into tenant data storage 122 by the save routines 236 for execution by subscribers as one or more tenant process spaces 204 managed by the tenant management process 210, for example. Invocations to such applications may be coded using SOQL 234 that provides a programming language style interface extension to the API 232. Some embodiments of SOQL language are discussed in further detail in U.S. Pat. No. 7,730,478, filed September, 2007, entitled, "Method and System For Allowing Access to Developed Applications Via a Multi-Tenant On-Demand Database Service," which is incorporated herein by reference. Invocations to applications may be detected by one or more system processes, which manage retrieving the application metadata 216 for the subscriber, making the invocation and executing the metadata as an application in a virtual machine.

Each application server 200 may be communicably coupled to database systems, e.g., having access to the system data 125 and the tenant data 123, via a different network connection. For example, one application server $200_1$ might be coupled via the network 114 (e.g., the Internet), another application server $200_{N-1}$ might be coupled via a direct network link, and another application server $200_N$ might be coupled by yet a different network connection. TCP/IP are typical protocols for communicating between application servers 200 and the database system. However, it will be apparent to one skilled in the art that other transport protocols may be used to optimize the system depending on the network connection used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, therefore, an interface system implementing a load balancing function (e.g., an F5 Big-IP load balancer) is communicably coupled between the application servers 200 and the user systems 112 to distribute requests to the application servers 200. In one embodiment, the load balancer uses a least connections algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, the system 116 is multi-tenant, wherein the system 116 handles storage of, and access to, different objects, data and applications across disparate users and organizations.

As an example of storage, one tenant might be a company that employs a sales force where each salesperson uses the system 116 to manage his or her sales process. Thus, a user might maintain contact data, leads data, customer follow-up data, performance data, goals and progress data, etc., all applicable to that user's personal sales process (e.g., in the tenant data storage 122). In an example of a MTS arrangement, since all the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all the users for a given organization that is a tenant. Thus, there may be some data structures managed by the system 116 that are allocated at the tenant level while other data structures might be managed at the user level. Because a MTS might support multiple tenants including possible competitors, the MTS may have security protocols that keep data, applications, and application use separate. Also, because many tenants may opt for access to a MTS rather than maintain their own system, redundancy, up-time, and backup are additional functions that may be implemented in the MTS. In addition to user-specific data and tenant-specific data, the system 116 might also maintain system level data usable by multiple tenants or other data. Such system level data might include industry reports, news, postings, and the like that are sharable among tenants.

In certain embodiments, the user systems 112 (which may be client systems) communicate with the application servers 200 to request and update system-level and tenant-level data from the system 116 that may require sending one or more queries to the tenant data storage 122 and/or the system data storage 124. The system 116 (e.g., an application server 200 in the system 116) automatically generates one or more structured query language (SQL) statements (e.g., one or more SQL queries) that are designed to access the desired information. The system data storage 124 may generate query plans to access the requested data from the database.

In a database system, such as system 116 shown and described with respect to FIGS. 1 and 2, data or information may be organized or arranged in categories or groupings. Each database can generally be viewed as a collection of objects, such as a set of logical tables, containing data fitted into predefined categories. A "table" is one representation of a data object and may be used herein to simplify the conceptual description of objects. It should be understood that "table" and "object" may be used interchangeably herein. Each table generally contains one or more data categories logically arranged as columns or fields in a viewable schema. Each row or record of a table contains an instance of data for each category defined by the fields.

In a CRM system, for example, these categories or groupings can include various standard entities, such as account, contact, lead, opportunity, group, case, knowledge article, etc., each containing pre-defined fields. For example, a CRM database may include a table that describes a customer with fields for basic contact information such as name, address, phone number, fax number, etc. Another table might describe a purchase order, including fields for information such as customer, product, sale price, date, etc. In some MTS, standard entity tables might be provided for use by all tenants.

In some MTSs, tenants may be allowed to create and store custom objects, or they may be allowed to customize standard entities or objects, for example by creating custom fields for standard objects, including custom index fields. Systems and methods for creating custom objects as well as customizing standard objects in an MTS are described in further detail in U.S. Pat. No. 7,779,039, filed Apr. 2, 2004, entitled "Custom Entities and Fields in a Multi-Tenant Database System," which is incorporated herein by reference. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. Retrieve Data from a Database

Various users interacting with a system, such as an MTS, may manage and control data stored in the MTS. The term "user" may refer to an "entity," a "tenant," or an "organization." Users may store data via an object, which may come with a set of fields or attributes. A user may interact with a data storage via a user interface (UI). For example, the user may transmit a request to the data storage for data via the UI, and the data may return a result set responsive to the request to the user. For example, the user may request the result set to be filtered in accordance with filter criteria.

A user may enter filter criteria into the UI. The filter criteria may be associated with a first query and with a first UI view (e.g., a list-related view). Based on the first query, a first result set is displayed on the UI. Due to various reasons (e.g., a collection of user experiences), it may be desirable to generate a second query that is based on the same filter criteria, but displays a second result set that is different from the first result set. The second query is associated with a second UI view (e.g., a calendar-related view). The user may be able to switch between these views, which are associated with the same filter criteria, but based on different queries. The present disclosure provides techniques for transforming the filter criteria provided by the user to the second query that provides the second result set to the user. The following description provides details on how the second query is derived from the filter criteria and provides examples to better explain the concepts of the present disclosure.

Figure 3:
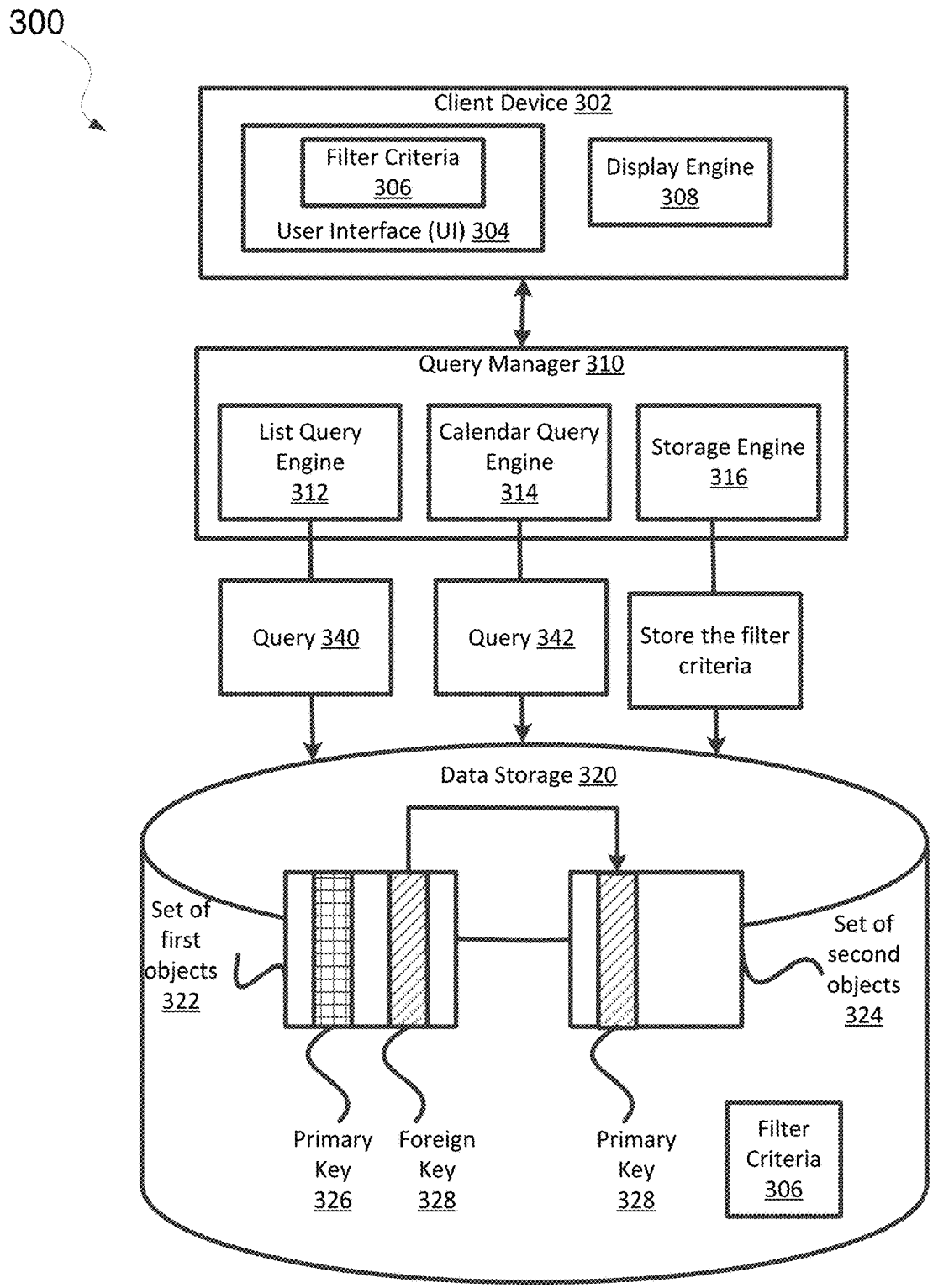
FIG. 3 illustrates a diagram for deriving different queries based on the same filter criteria according to some embodiments.

FIG. 3 illustrates a diagram 300 for deriving different queries based on the same filter criteria according to some embodiments. For example, components of diagram 300 may be, in some examples, implemented as part of the example environment 110. In FIG. 3, a client device 302 includes a UI 304 and a display engine 308. The client device 302 may correspond to the user system 112 shown in FIG. 1. The user may interact with a query manager 310 and a data storage 320 via the UI 304. For example, the user may interact with the UI 304, and the display engine 308 may display, based on the user's input, data in the UI 304 for the user to view. The user may enter filter criteria 306 into the UI 304, and the client device 302 may transmit a request including the filter criteria 306 along with additional information to the query manager 310. The additional information may specify, for example, a context in which the filter criteria 306 is entered in the UI 304 and a view. The view may specify a list-related view or a calendar-related view, and the context may correspond to a foreign key and may be provided if the request specifies a calendar-related view. The user may switch between these views using the UI 304, with each view showing the user a different set of information. The list-related view and the calendar-related view are driven by the same set of filter criteria. The context and the view will be discussed in more detail below. Aspects of the disclosure may provide benefits such as providing the user with additional information in their result sets from a search.

The data storage 320 may store a set of first objects 322 and a set of second objects 324. Each object of the set of first objects 322 and the set of second objects 324 may have a set of fields. The filter criteria 306 may apply to the set of first objects 322 and in particular, may specify one or more conditions that apply to the fields in the set of first objects 322. The set of fields in the first object may include a primary key 326 and may include a foreign key 328. It should be understood that an object may have more than one primary key and/or more than one foreign key. The foreign key 328 in the first object is a primary key for the set of second objects 324.

The query manager 310 includes a list query engine 312, a calendar query engine 314, and a storage engine 316. The storage engine 316 may receive the filter criteria 306 and store the filter criteria 306 to the data storage 320. The list query engine 312 may process requests specifying the list-related view, and the calendar query engine 314 may process requests specifying the calendar-related view. Each of these views will be discussed in greater detail below. If the client device 302's request specifies a list-related view and the filter criteria 306 specifies a condition for the set of first objects 322, the list query engine 312 may generate a query 340 specifying a selection from the set of first objects 322 based on the filter criteria 306. The query 340 is specific to a list-related view of the set of first objects 322. The list query engine 312 may execute the query 340 against the data storage 320 and return a result set of the query 340 to the client device 302. The display engine 308 may display, on the client device 302, the result set of the query 340 using the list-related view.

Alternatively, if the client device 302's request specifies a calendar-related view, a context corresponding to the foreign key 328, and the filter criteria 306 specifies a condition for the set of first objects 322, the calendar query engine 314 may determine that the foreign key 328 is a primary key for the set of second objects 324 and retrieve the filter criteria 306 to generate a query 342 specifying a selection from the set of second objects 324 based on the filter criteria 306. The query 342 is specific to a calendar-related view of the set of second objects 324. The calendar query engine 314 may execute the query 342 against the data storage 320 and return a result set of the query 342 to the client device 302. The display engine 308 may display, on the client device 302, the result set of the query 342 using the calendar-related view.

A. The User Transmits Filter Criteria to the System Via a User Interface (UI) for Processing FIGS. 4-8 illustrate UIs 400, 500, 600, 700, and 800 respectively, according to some embodiments. The UIs 400, 500, 600, 700, and 800, may correspond to the UI 304, and FIGS. 4-8 will be discussed in relation to FIG. 3 to better understand some concepts that are taught in the present disclosure. The set of first objects 322 and the set of second objects 324 in FIG. 3 may correspond to the set of Shift objects and the set of Territory objects in FIGS. 4-8, respectively.

Figure 4:

In FIG. 4, the display engine 308 may display a set of ten Shift objects in the UI 400. The display engine 308 may display the set of ten Shift objects based on a request from the client device 302 to the data storage 320 for information on Shift records. As shown in the UI 400, each Shift record may include fields for a job profile (e.g., electrician, plumber, or dispatch), a status of the shift (e.g., confirmed or tentative), a start time of the shift, an end time of the shift, a service resource who has been assigned the shift, and a service territory at which the service will take place. To ease the user's review of interesting data, the user may select a user-selectable filter option 402 that allows the user to enter filter criteria as a user input. In response to detecting a selection of the filter option 402, as shown by the pattern-filled box, the display engine 308 may display a filter input box 404 in the UI 400, where the user may narrow down her search for particular Shift records that satisfy one or more conditions.

An object may have an owner that is identified by an owner identity (ID). For example, a Shift object may have one or more fields, and one of these fields may include an "OwnerID" field that is a reference to the user who owns that object. Ownership of a record may affect the security model, and any user may query the "OwnerID" field for any record they can access and/or may grant access to the record to other users. As shown in the UI 400, the user may select a user-selectable "Filter by Owner" option 407. In response to detecting a selection of the user-selectable "Filter by Owner" option 407, the display engine 308 may display an ownership input box 409 providing an "All Shifts," "My Shifts," and "Queue Owned Shifts" user-selectable option. The user may select any one of the "All Shifts," "My Shifts," and "Queue Owned Shifts" user-selectable options. In response to detecting that the "All Shifts" option is selected, the display engine 308 may display a shift in the list-related view regardless of the value of the shift's "OwnerID" field. In response to detecting that the "My Shifts" option is selected, the display engine 308 may display a shift in the list-related view only if the shift's "OwnerID" field references the user's user ID. In response to detecting that the "Queue Owned Shifts" option is selected, the display engine 308 may display a shift in the list-related view only if the shift's "OwnerID" field references a specified queue ID. A queue may be identified by a queue ID and associated with a group of users. Additionally, the queue may be used to manage, for example, incoming work for the group of users. A queue may own records, and users may be added to the queue. A record may include one or more work items. As work items are inserted into the queue, the work items may be assigned an "OwnerID"="QueueItems". When a user of the group of users has bandwidth, the user may use the list-related view to view the work items that are in the queue. The user may reassign a work item in the queue to herself (e.g., set "OwnerId"="UserID_1"), and process the work item. If the "OwnerID"="UserID_1", other users that are part of the group would see that the work item is no longer owned by "QueueItems" and would not process the work item. In this example, the user identified by the "UserID_1" may process the work item.

As shown in the ownership input box 409, the user may select the "All Shifts" option, and display engine 308 may display a set of shifts in the list-related view regardless of the value of the their associated "OwnerID" fields. Additionally, the filter input box 404 includes a user-selectable "Add Filter" option 406 and a user-selectable "Remove All" option 408. In response to detecting a selection of the user-selectable "Add Filter" selection 406 in the UI 400, as shown by the pattern-filled box, the display engine 308 may display additional user-selectable options by which the user may select for filtering the Shift records, such as shown in FIG. 5.

In FIG. 5, the user may enter a first condition 502 of a filter criteria as user input into the filter input box 404 in the UI 500. In the example illustrated in FIG. 5, the first condition 502 is applied to a set of Shift objects and filters for a Service Resource that contains "Smith." In this example, any person with "Smith" in his or her name would satisfy this criterion. Accordingly, any Shift records that contain "Smith" in the Service Resource field may be selected and provided to the user. The user may select a user-selectable "Done" option 506 to indicate that the user is finished inputting the first condition 502 of the filter criteria. In response to detecting a selection of the user-selectable "Done" option 506 in the UI 500, the display engine 308 may display the first condition 502 in the filter input box 404, as shown in FIG. 6.

Figure 6:

In FIG. 6, a filter indicator 610 (e.g., the "1" in the circle) indicates the first condition 502 of the filter criteria. Additionally, the display engine 308 may display the user-selectable "Add Filter" option 406 and the user-selectable "Remove All" option 408 in the UI 600. If the user desires to remove all conditions of the filter criteria, the user may select the user-selectable "Remove All" option 408. If the user desires to enter an additional condition to the filter criteria, the user may select the user-selectable "Add Filter" option 406 in the UI 600, as shown by the pattern-filled box in FIG. 6. In response to detecting a selection of the user-selectable "Add Filter" option 406 in the UI 600, the display engine 308 may display the UI 700 shown in FIG. 7.

Figure 7:
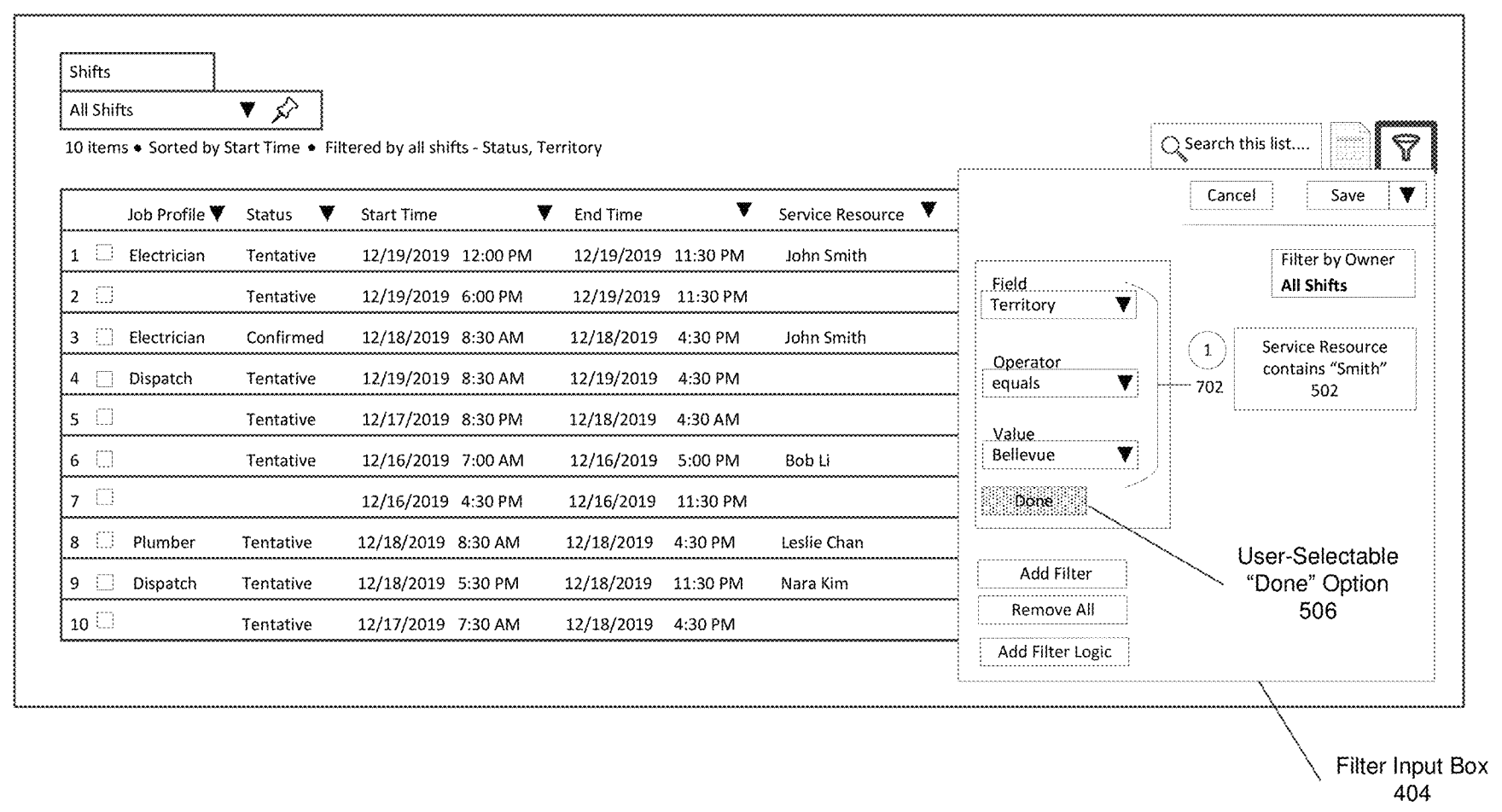

In FIG. 7, the user may enter a second condition 702 of a filter criteria as user input into the filter input box 404 in the UI 700. In the example illustrated in FIG. 7, the second condition 702 is applied to a set of Shift objects and filters for a Territory that is "Bellevue." In this example, any shift that is in Bellevue would satisfy this criterion. Accordingly, any Shift records that contain "Bellevue" as the Territory field may be selected and provided to the user. The user may select the user-selectable "Done" option 506 to indicate that the user is finished inputting the second condition of 702 of the filter criteria. In response to detecting a selection of the user-selectable "Done" option 506 in the UI 700, the display engine 308 may display the UI 800 shown in FIG. 8.

Figure 8:
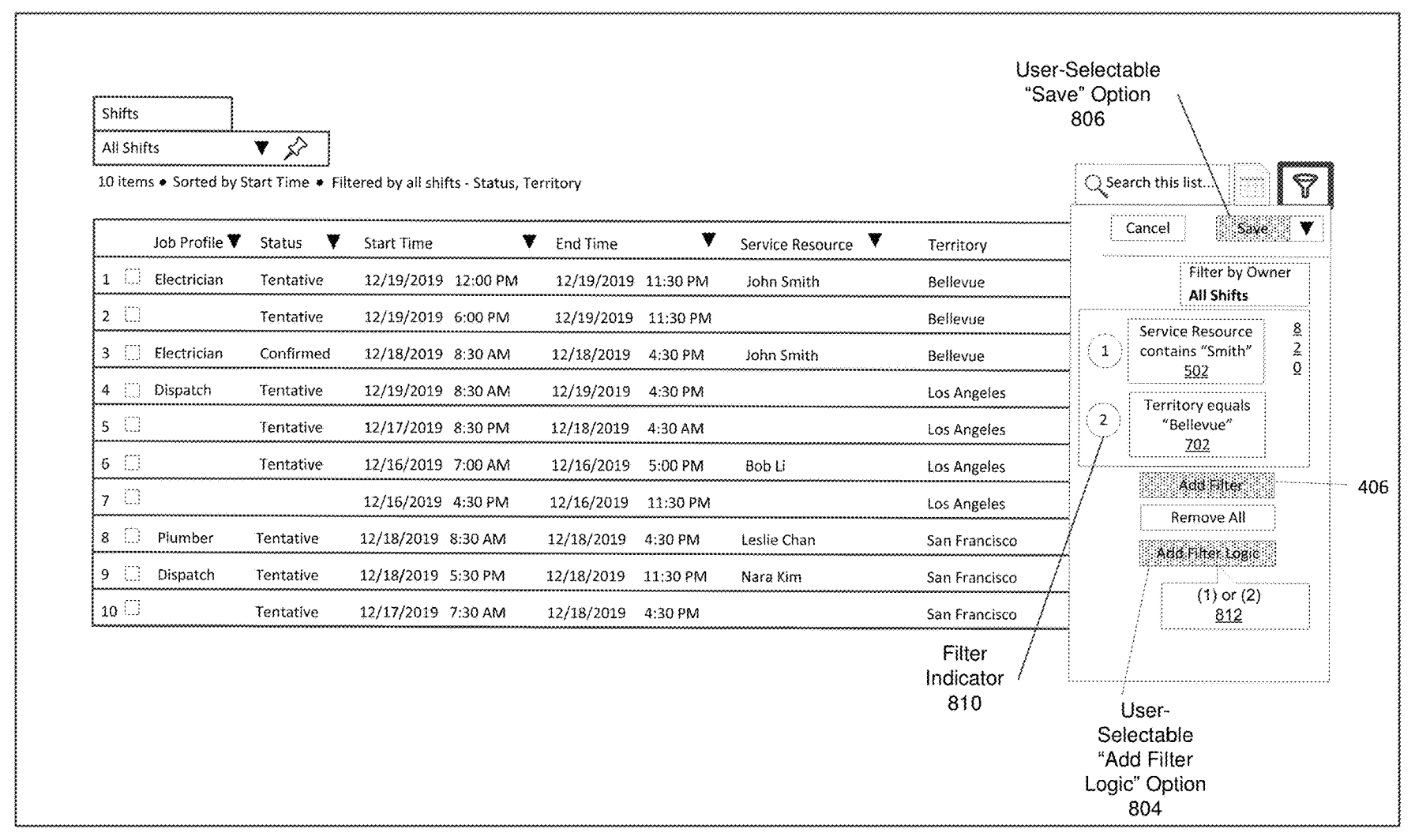

In FIG. 8, a filter indicator 810 (e.g., the "2" in the circle) indicates the second condition 702 of the filter criteria. As shown, the filter criteria 820 includes the first condition 502 and the second condition 702. The user may select a user-selectable "Add Filter Logic" option 804 in the UI 800. In response to detecting a selection of the user-selectable "Add Filter Logic" option 804 in the UI 800, the display engine 308 may display a callout box 812 in which the user may enter a relationship between any of the conditions of the filter criteria. In the example illustrated in FIG. 8, the user may enter in the filter logic "(1) or (2)," which indicates that a Shift record should be returned if the Shift record satisfies the first condition 502 or the second condition 702 of the filter criteria 820. If the user desires to enter in additional conditions of the filter criteria 820, the user may select the user-selectable "Add Filter" option 406 in the UI 800.

When the user is finished entering the filter criteria, the user may select a user-selectable "Save" option 806, as shown by the pattern-filled box. By selecting the user-selectable "Save" option, the user may indicate that the user desires to save the filter criteria 820 specifying the first condition 502 and the second condition 702. In response to detecting a selection of the user-selectable "Save" option 806 in the UI 800, the client device 302 may transmit a request including the filter criteria 820 and additional information to the query manager 310 in FIG. 3 for processing.

B. Derivation of a Query Specific to a List-Related View

Figure 9:
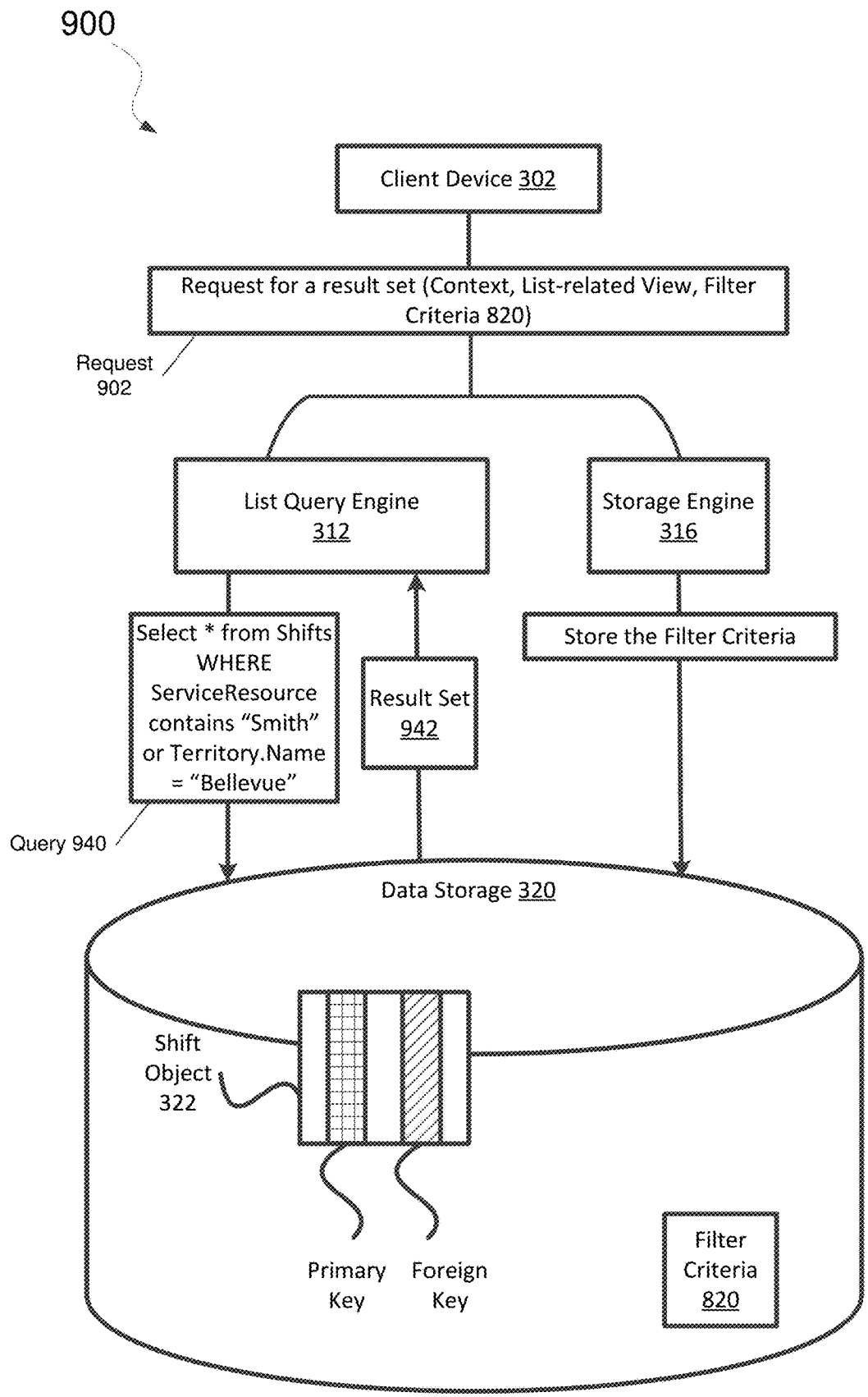
FIG. 9 illustrates a diagram for deriving a query specific to a list-related view based on the filter criteria according to some embodiments.

FIG. 9 illustrates a diagram 900 for deriving a query specific to a list-related view based on the filter criteria 820 according to some embodiments. In FIG. 9, the client device 302 may transmit a request 902 to the query manager 310, the request being for a result set based on the filter criteria 820. The request 902 may include a context specifying the Shift object, a list-related view, and the filter criteria 820. The storage engine 316 may receive the request 902 and store the filter criteria 820 including the first condition 502 and the second condition 702 into the data storage 320.

The list query engine 312 may process the request 902 and generate a query 940 based on the request 902. The list query engine 312 may generate the query 940, where the query 940 specifies a selection from the set of Shift objects based on the first condition 502 and the second condition 702 of the filter criteria 820. In the example illustrated in FIG. 9, the query 940 is "Select * from Shifts WHERE ServiceResource contains 'Smith' or Territory.Name='Bellevue'". The query 940 is specific to a list-related view of the set of Shift objects. The list query engine 312 executes the query 940 against the data storage 320, which returns the result set 942 of the query 940. The list query engine 312 returns the result set 942 responsive to the request 902 to the client device 302. The list query engine 312 may cause the result set 942 to be displayed on the client device 302, the result set 942 being displayed using the list-related view. The client device 302 may receive the result set 942 from the list query engine 312 and accordingly display the result set 942 using the list-related view. It should be understood that any reference to the client device 302 displaying data may be a result of the list query engine 312 causing the client device 302 to display the data on the client device 302.

Figure 10:
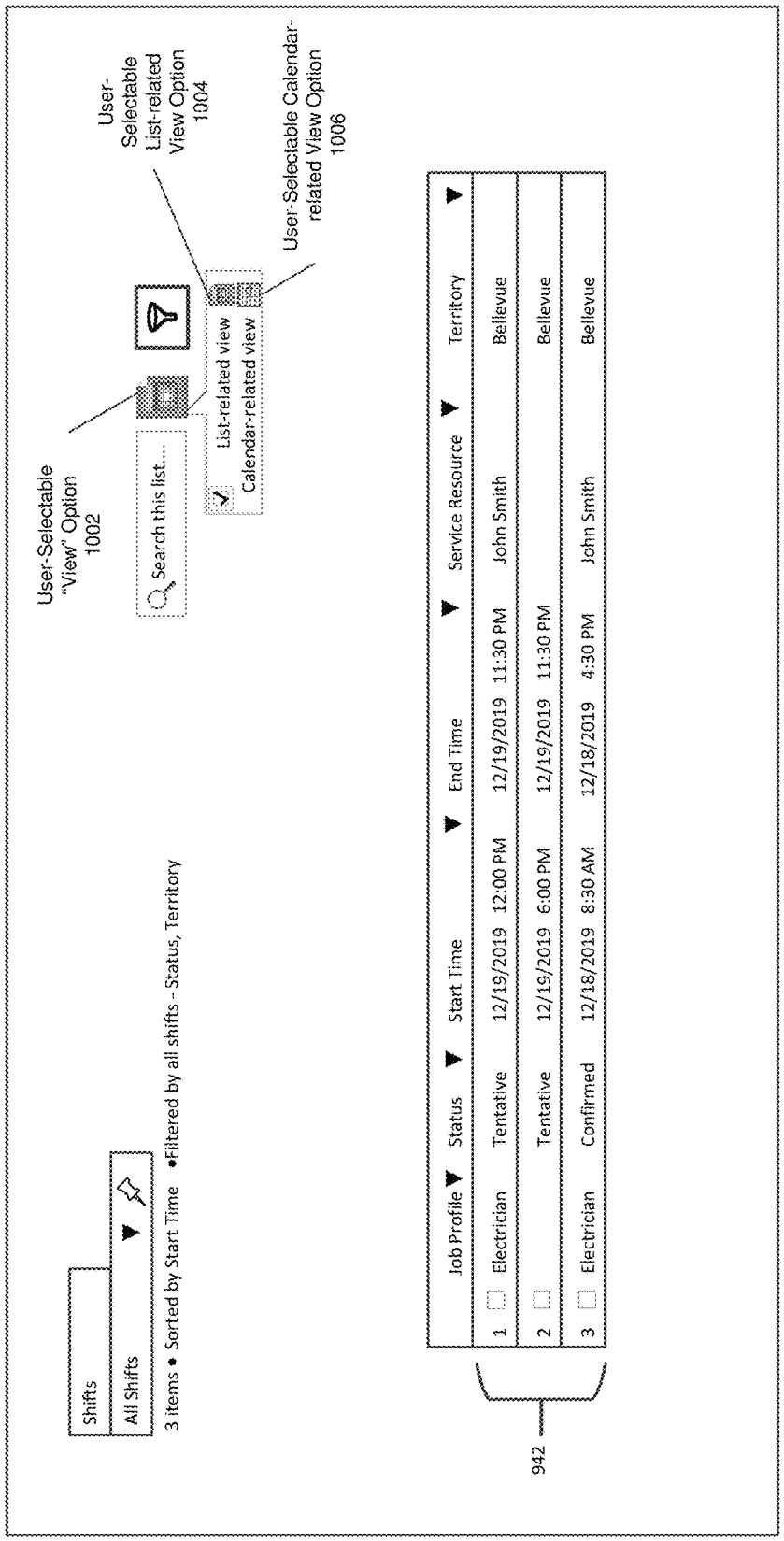
FIG. 10 illustrates a UI that displays a result set on a client device according to some embodiments.

FIG. 10 illustrates a UI 1000 that displays the result set 942 on the client device 302 according to some embodiments. In FIG. 10, the result set 942 includes a set of three Shift objects (from the set of ten Shift objects in FIG. 4) that satisfies the filter criteria 820. Additionally, in the UI 1000, a user-selectable "View" option 1002 is shown. The user-selectable "View" option 1002 provides for a user-selectable list-related view option 1004 and a user-selectable calendar-related view option 1006. The display engine 308 may display the result set 942 in the UI 1000 using the list-related view, as shown by the checkmark next to "List-related view" in the UI 1000. The user may request to switch from the list-related view to a calendar-related view by selecting the user-selectable calendar-related view option 1006. In response to detecting a selection of the user-selectable calendar-related view option 1006, the client device 302 may transmit a request to switch from the list-related view to a calendar-related view. In response to receiving the switch request, the query manager 310 may derive a query specific to a calendar-related view based on the filter criteria 820 and return a result set of the query to the client device 302.

The first query may be modified to show X days of data, where X is a number greater than one. In an example, X is seven, and the result set of the second query shows one week of data. In this example, the modified first query may be executed once per each week viewed.

C. Derivation of a Query Specific to a Calendar-Related View

Figure 11:
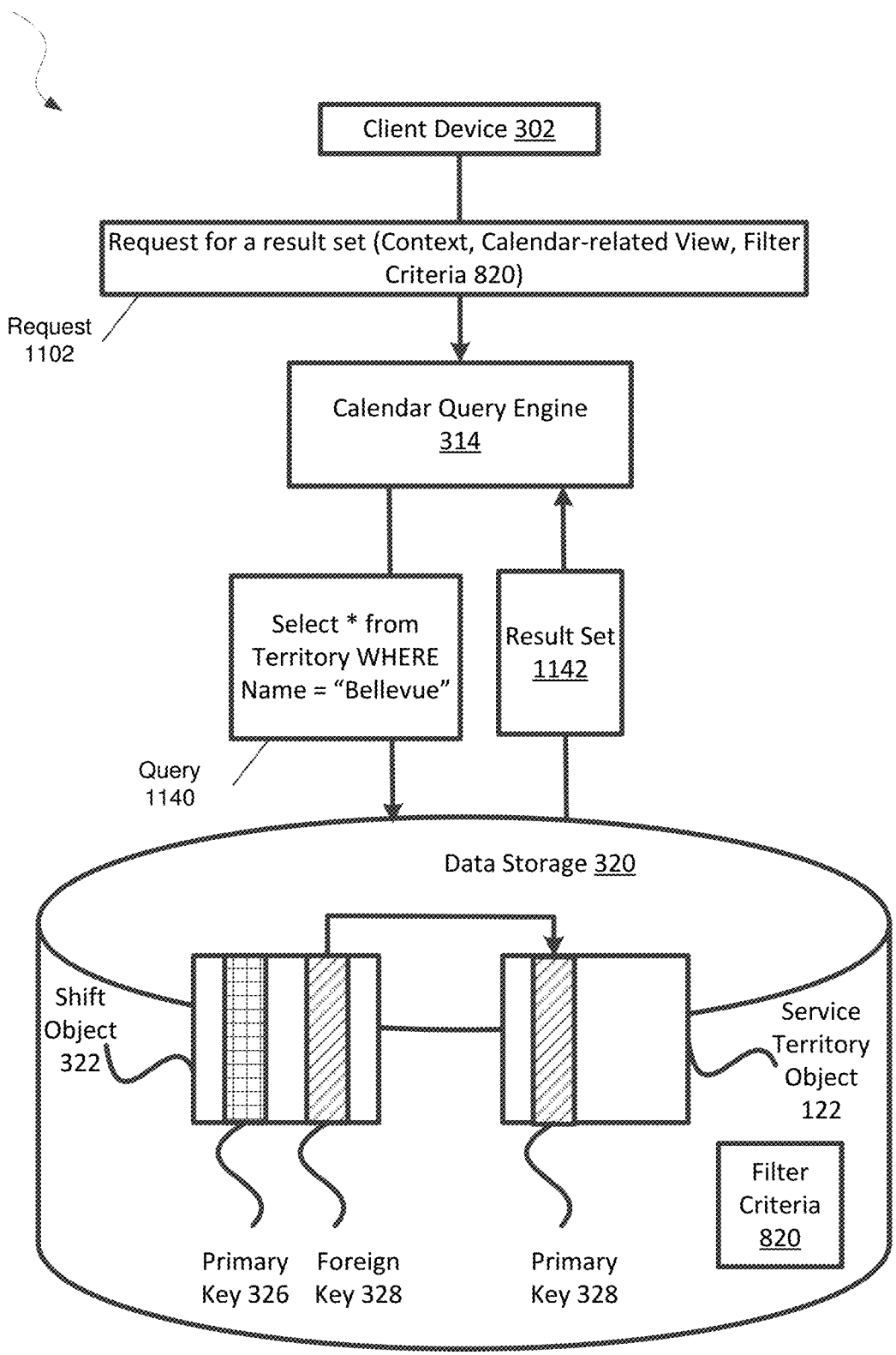
FIG. 11 illustrates a diagram for deriving a query specific to a calendar-related view based on the filter criteria according to some embodiments.

FIG. 11 illustrates a diagram 1100 for deriving a query specific to a calendar-related view based on the filter criteria 820 according to some embodiments. In FIG. 11, the client device 302 may transmit a request 1102 to the query manager 310, the request being for a result set based on the filter criteria 820. The request 1102 may specify a calendar-related view and the filter criteria 820. Additionally, the request may include a context specifying the Territory object, which includes a primary key referenced by the Shift object. The calendar query engine 314 may process the request 1102 and generate a query 1140 based on the request 1102. The query 1140 shows the set of second objects (e.g., Territories) that are relevant based on the filter criteria 820.

The calendar query engine 314 may determine the foreign key 328 from a set of foreign keys for the set of Shift objects. The foreign key 328 is a primary key for the set of Territory objects. The calendar query engine 314 may generate the query 1140, where the query 1140 specifies a selection from the set of Territory objects based on the first condition 502 and the second condition 702 of the filter criteria 820. In the example illustrated in FIG. 11, the query 1140 is "Select * from Territory WHERE Name='Bellevue'". The query 1140 is specific to a calendar-related view of the set of Territory objects. The calendar query engine 314 executes the query 1140 against the data storage 320, which returns the result set 1142 of the query 1140. The calendar query engine 314 returns the result set 1142 responsive to the request 1102 to the client device 302. The calendar query engine 314 may cause the result set 1142 to be displayed on the client device 302, the result set 1142 being displayed using the calendar-related view. The client device 302 may receive the result set 1142 from the calendar query engine 314 and accordingly display the result set 1142 using the calendar-related view. It should be understood that any reference to the client device 302 displaying data may be a result of the calendar query engine 314 causing the client device 302 to display the data on the client device 302.

Figure 12:
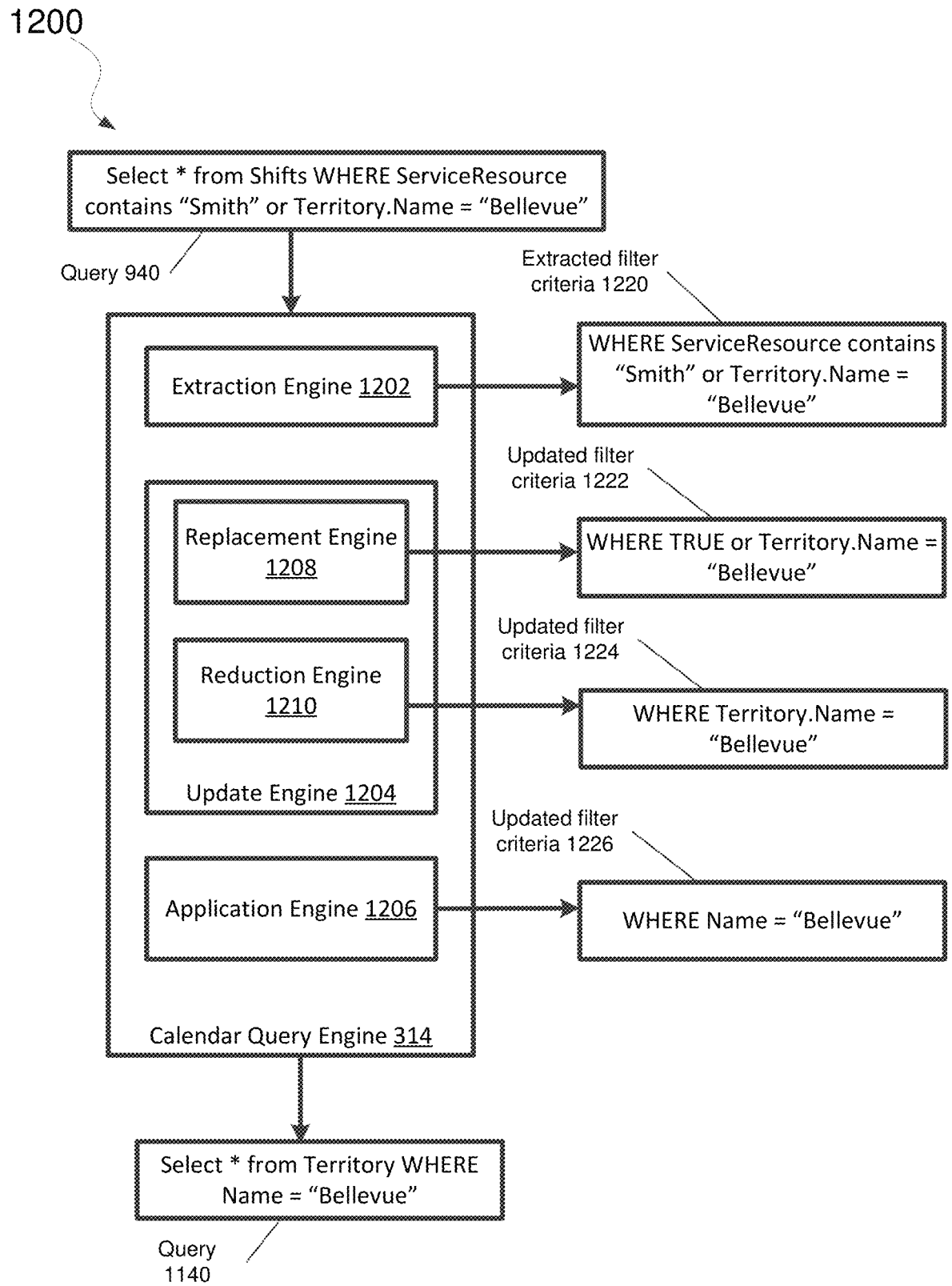
FIG. 12 illustrates a diagram for deriving a query specific to a calendar-related view based on the filter criteria according to some embodiments.

FIG. 12 illustrates a diagram 1200 for deriving a query specific to a calendar-related view based on the filter criteria 820 according to some embodiments. In FIG. 12, the calendar query engine 314 includes an extraction engine 1202, an update engine 1204, and an application engine 1206. The extraction engine 1202, the update engine 1204, and the application engine 1206 may perform actions to derive a query specific to the calendar-related view based on the filter criteria 820, which is also used for deriving a query specific to the list-related view.

In the example illustrated in FIG. 12, the calendar query engine 314 receives the query 940 in FIG. 9. The extraction engine 1202 may extract the filter criteria 820 from the query 940 and identify a set of conditions specified in the extracted filter criteria 1220. For example, the extraction engine 1202 may extract the WHERE clause and identify the set of conditions specified in the WHERE clause. The first condition may be "ServiceResource contains 'Smith' (e.g., condition 502), and the second condition may be Territory.Name='Bellevue'" (e.g., condition 702). The extracted filter criteria 1220 may be "WHERE ServiceResource contains 'Smith' or Territory.Name='Bellevue'".

The update engine 1204 may update the extracted filter criteria 1220 and includes a replacement engine 1208 and a reduction engine 1210. For each condition of the set of conditions, the replacement engine 1208 may determine whether the respective condition references a second object of the set of second objects (e.g., Territory object). The replacement engine 1208 updates the extracted filter criteria 1220 by replacing the respective condition with a Boolean value of true in response to a determination that the respective condition does not reference the second object. For example, the replacement engine 1208 may determine that "ServiceResource contains 'Smith' does not reference the Territory object and accordingly replaces this condition with TRUE. The replacement engine 1208 may determine that "Territory.Name='Bellevue' references the Territory object and accordingly does not replace this condition with TRUE. After the replacement engine 1208 is finished, the replacement engine 1208 may produce updated filter criteria 1222, which includes "WHERE TRUE or Territory.Name='Bellevue'".

The reduction engine 1210 may reduce the updated filter criteria 1222. For example, the reduction engine 1210 may determine whether the updated filter criteria 1222 includes one or more Boolean values of true and may further update the updated filter criteria 1222 by simplifying the set of conditions in response to a determination that the set of conditions includes one or more Boolean values of true. For example, the reduction engine 1210 may remove the TRUE from the updated filter criteria 1222. After the reduction engine 1210 is finished, the reduction engine 1210 may produce updated filter criteria 1224, which includes "WHERE Territory.Name='Bellevue'".

The application engine 1206 may apply the updated filter criteria to the set of Territory objects. The updated filter criteria will be executed against the set of Territory objects. Accordingly, "Territory.Name" may be reduced to "Name." The application engine 1206 may remove the reference to "territory" and accordingly produce updated filter criteria 1226, which includes "WHERE Name='Bellevue'". The second query specifies a selection from the set of Territory objects using the updated filter criteria 1226. The calendar query engine 314 generates the query 1140 specifying a selection from the set of Territory objects that satisfy the condition "Name='Bellevue'".

Figure 13:
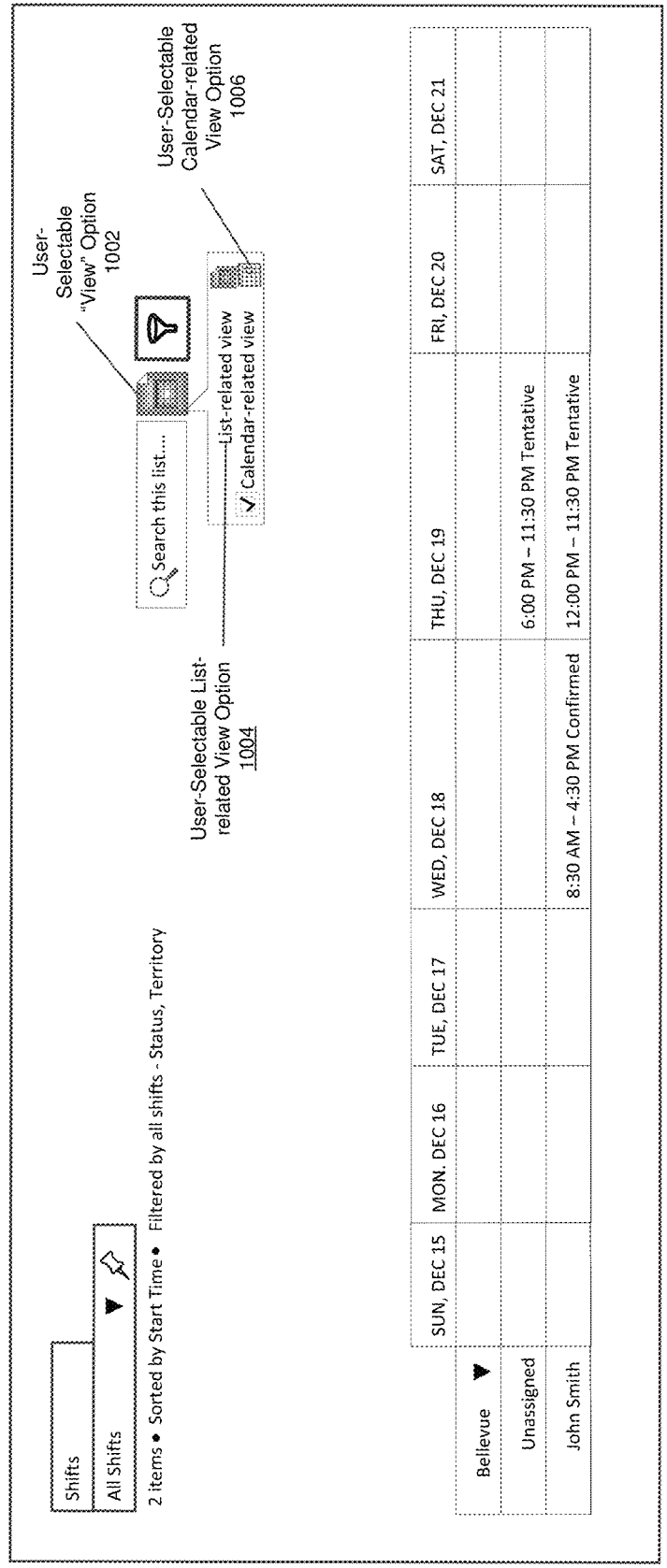
FIG. 13 illustrates a UI that displays a result set on a client device according to some embodiments.

FIG. 13 illustrates a UI 1300 that displays the result set 1142 on the client device 302 according to some embodiments. In FIG. 13, the result set 1142 is selected from the Territory objects and includes a set of two Territory objects that satisfies the filter criteria 820. The result set of the query 942 may be different from the result set of the query 1142.

Additionally, in the UI 1300, the user-selectable "View" option provides for the user-selectable list-related view option 1004 and the user-selectable calendar-related view option 1006. The display engine 308 may display the result set 1142 in the UI 1300 using the calendar-related view, as shown by the checkmark next to "Calendar-related view" in the UI 1300. The user may request to switch from the calendar-related view to the list-related view by selecting the user-selectable list-related view option 1004. In response to detecting a selection of the user-selectable list-related view option 1004, the client device 302 may transmit a request to switch from the calendar-related view to a list-related view. In response to receiving the switch request, the query manager 310 may derive a query specific to a list-related view based on the filter criteria 820 and return a result set of the query to the client device 302. For example, the client device 302 may transmit the request 902 to the query manager 310, as shown in FIG. 9, and the list query engine 312 may generate the query 940 and the result set of the query 940 to the client device 302.

Aspects of the present disclosure may provide benefits for calendar-based UIs in which grouping by categories (e.g., objects) may be visually appealing. One set of filter criteria (e.g., filter criteria 820) may be shared and may power different visualizations (e.g., the list-related view and the calendar-related view). As shown in FIG. 9 and FIG. 11, the result set of the query 940 does not show any groupings, and the result set of the query 1140 does show groupings. The result set of the query 1140 is grouped by the set of second objects. The set of first objects associated with the query 940 may be associated with any set of objects (e.g., set of second objects or set of Territory objects) that has been shown by, for example, a collection of user experiences to be helpful for the user to view. The result set of the query 1140 may provide a different way of organizing the information based on the filter criteria 820 by selecting from a different set of objects and by grouping the result set by the different set of objects.

Additionally, the result set of the query 1140 may be helpful for the user to view information that the user would otherwise not view in the result set of the query 940. In some examples, even if the result set of the query 940 returns an empty set because no records matched the filter criteria, the result set of the query 1140 may return a non-empty set. For example, the result set of the query 1140 may provide placeholders for the user to view additional information (e.g., Territory records that did not satisfy the filter criteria based on the first query, but do satisfy the filter criteria based on the second query).

D. Context Associated with More than One Foreign Key

In some aspects, the set of first objects (e.g., set of Shift objects) may include more than one foreign key. To avoid confusion on which set of objects the calendar-related query should select from, the client device 302 may transmit in its request for query processing a context in which the filter criteria is entered in the UI.

Figure 14:
FIG. 14 illustrates a UI that displays a result set and three different tabs on a client device according to some embodiments.

FIG. 14 illustrates a UI 1400 that displays a result set and three different tabs on the client device 302 according to some embodiments. The filter criteria that provides the result set displayed in the UI 1400 may correspond to the filter criteria 820 in FIG. 8. Additionally, the set of Shift objects may include a plurality of foreign keys, each foreign key of the plurality of foreign keys being associated with a tab displayed in the UI 1400. The user may select the tab 1402 associated with a first foreign key, the tab 1404 associated with a second foreign key, or the tab 1406 associated with a third foreign key. The set of Shift objects references the first, second, and third foreign keys. Although three foreign keys are described, it should be understood that an object may include one, two, four or more foreign keys.

In some aspects, the tab 1402 may correspond to the Territory objects, the tab 1404 may correspond to a Job Profile object, and the tab 1406 may correspond to a Job Status object. In the example illustrated in FIG. 14, the tab 1402 has been selected and is associated with the first foreign key. The tab 1402 may be selected by default when the user selects the user-selectable calendar-related view option 1006 from a list-related view. The client device 302 may determine that the context in which the filter criteria 820 is entered in the UI 1400 includes the tab 1402. In this example, when the client device 302 transmits a request for a result set, the client device 302 may include the request the context associated with the tab 1402 or the first foreign key. In response to receiving a requesting including the context associated with the tab 1402 or the first foreign key, the query manager 310 determines to which set of objects the first foreign key is a primary key and generates a query specifying a selection from the determined set of objects based on the filter criteria.

If the tab 1402 or the tab 1406 has been selected, the user may switch to the table 1404. If the tab 1404 is selected, the client device 302 may determine that the context in which the filter criteria 820 is entered in the UI 1400 includes the tab 1404. In this example, when the user selects the tab 1404, the client device 302 transmits a request for a result set, the client device 302 may include the request the context associated with the tab 1404 or the second foreign key. In response to receiving a requesting including the context associated with the tab 1404 or the second foreign key, the query manager 310 determines to which set of objects the second foreign key is a primary key and generates a query specifying a selection from the determined set of objects based on the filter criteria.

The client device 302 and the query manager 310 may perform similar actions in relation to the tab 1406.

III. Operational Flow

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, to avoid obscuring the present disclosure.

Figure 15:
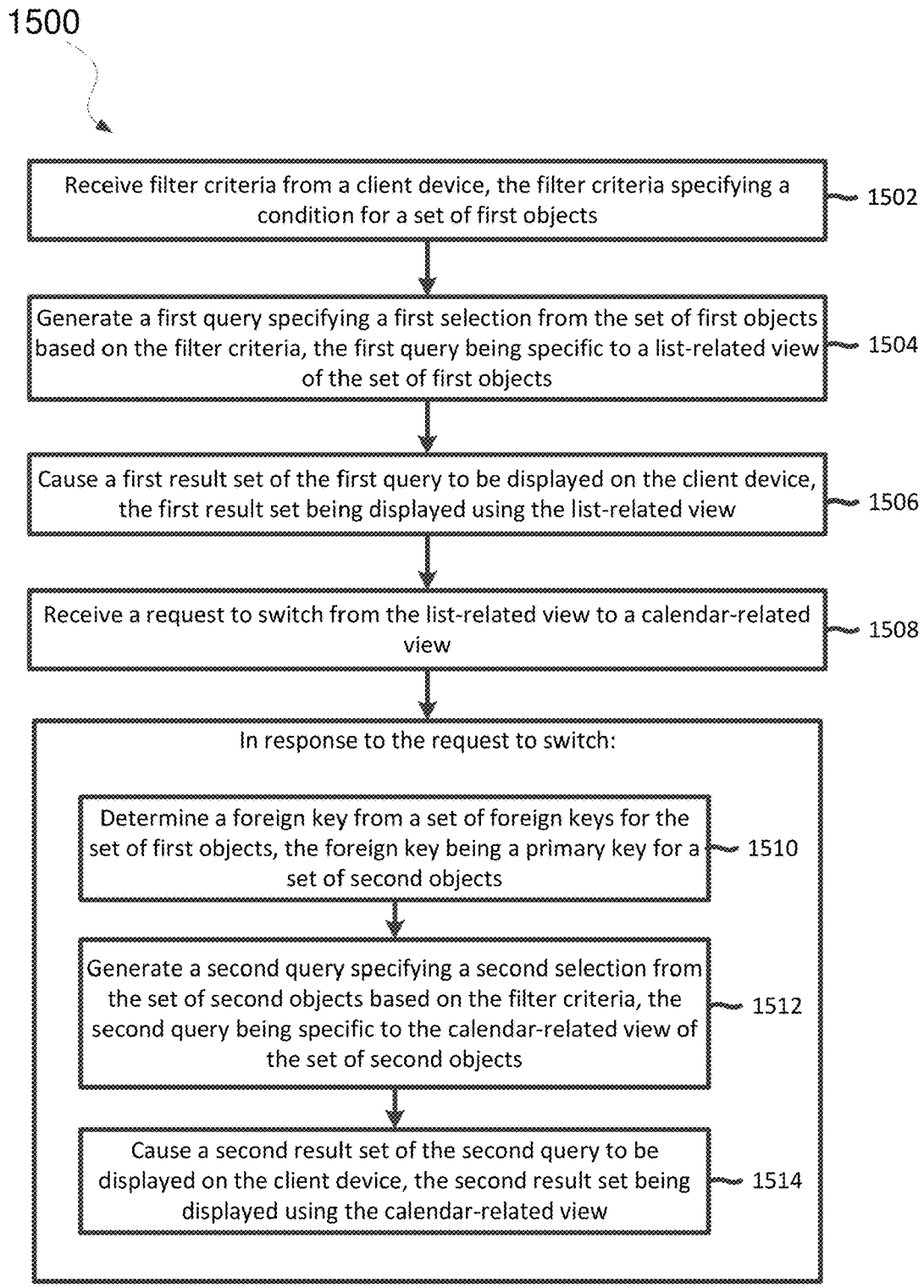
FIG. 15 is a flowchart of a method for deriving different queries based on the same filter criteria according to some embodiments.

FIG. 15 is a flowchart of a method 1500 for deriving different queries based on the same filter criteria according to some embodiments. One or more of the processes 1502-1514 of the method 1500 may be implemented, at least in part, in the form of executable code stored on non-transitory, tangible, machine-readable media that when run by one or more processors may cause the one or more processors to perform one or more of the processes 1502-1514. In some embodiments, method 1500 can be performed by one or more computing devices in systems or diagrams 100, 200, 300, 400, 500 600, 700, 800, 900, 1000, 1100, 1200, 1300, and 1400 of FIGS. 1-14, respectively, including the client device 302, the query manager 310, and/or the data storage 320. Aspects of the processes 1502-1514 of method 1500 have been covered in the description for FIGS. 1-14; and additional aspects are provided below.

At a process 1502, a computing device (e.g., via query manager 310) receives filter criteria from a client device, the filter criteria specifying a condition for a set of first objects. A user may enter the filter criteria into a UI of the client device 302, and the client device 302 may transmit a request including the filter criteria to the query manager 310. The request may specify a context in which the filter criteria is entered in the UI, a view (e.g., calendar-related view or list-related view), and/or the filter criteria. The filter criteria may include one or more conditions for the set of first objects.

At a process 1504, a computing device (e.g., via list query engine 312) generates a first query specifying a first selection from the set of first objects based on the filter criteria, the first query being specific to a list-related view of the set of first objects. In an example, the client device 302 may transmit a request specifying a context corresponding to the set of first objects, specifying a list-related view, and the filter criteria. The list query engine 312 receives the request and generates the first query.

At a process 1506, a computing device (e.g., via list query engine 312) causes a first result set of the first query to be displayed on the client device, the first result set being displayed using the list-related view. The list query engine 312 may execute the first query against a data storage (e.g., database) and receive the first result set of the first query from the data storage. The list query engine 312 may transmit the first result set of the first query to the client device 302 with instructions to the client device 302 to display the first result set using the list-related view on the client device 302. The display engine 308 may display the first result set in the UI and may also display the user-selectable "View" option 1002. The user-selectable "View" option 1002 may include the user-selectable "List-related View" option 1004 and the user-selectable "Calendar-related View" option 1006. In response to detecting a selection of the user-selectable "Calendar-related View" option 1006, the client device 302 transmits a request to switch from the list-related view to a calendar-related view to the query manager 310.

At a process 1508, a computing device (e.g., via query manager 310) receives a request to switch from the list-related view to a calendar-related view. The request may specify a context in which the filter criteria is entered, specify the calendar-related view, and include the filter criteria. In response to the request to switch from the list-related view to the calendar-related view, processes 1510, 1512, and 1514 are performed. At a process 1510, a computing device (e.g., via calendar query engine 314) determines a foreign key from a set of foreign keys for the set of first objects, the foreign key being a primary key for a set of second objects. If the set of first objects includes a plurality of foreign keys, at least foreign keys of the plurality referencing different sets of objects, the calendar query engine 314 may determine from the context specified in the request from which set of objects to select.

At a process 1512, a computing device (e.g., via calendar query engine 314) generates a second query specifying a second selection from the set of second objects based on the filter criteria, the second query being specific to the calendar-related view of the set of second objects. The context corresponds to the set of second objects. At a process 1514, a computing device (e.g., via calendar query engine 314) causes a second result set of the second query to be displayed on the client device, the second result set being displayed using the calendar-related view. The calendar query engine 314 may execute the second query against a data storage (e.g., database) and receive the result set of the second query from the data storage. The calendar query engine 314 may transmit the second result set of the second query to the client device 302 with instructions to the client device 302 to display the second result set using the calendar-related view on the client device 302. The display engine 308 may display the second result set in the UI and may also display the user-selectable "View" option 1002. The user-selectable "View" option 1002 include the user-selectable "List-related View" option 1004 and the user-selectable "Calendar-related View" option 1006. In response to detecting a selection of the user-selectable "List-related View" option 1004, the client device 302 transmits a request to switch from the calendar-related view to the list-related view to the query manager 310. In this example, the list query engine 312 may process the request, generate a query based on the request, and return a result set of the query using a list-related view.

In some aspects, the UI may display a plurality of tabs, each tab corresponding to a set of objects including a primary key that is referenced by the set of first objects. The user may select a tab of the plurality of tabs. In response to detecting a selection of the tab, the client device 302 may transmit a request specifying a context in which the filter criteria is entered (e.g., corresponding to the selected tab), specifying the calendar-related view, and including the filter criteria.

In some embodiments, one or more actions illustrated in processes 1502-1514 may be performed for any number of objects per-tenant. It is also understood that additional processes may be performed before, during, or after processes 1502-1514 discussed above. It is also understood that one or more of the processes of method 1500 described herein may be omitted, combined, or performed in a different sequence as desired.

Unless specifically stated otherwise as apparent from the following discussion, it is appreciated that throughout the description, discussions utilizing terms such as "determining," "receiving," "generating," "displaying," "determining," "executing," "extracting," "identifying," "updating," "applying," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may include a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative embodiments have been shown and described, a wide range of modifications, changes and substitutions is contemplated in the foregoing disclosure and in some instances, some features of the embodiments may be employed without a corresponding use of other features. One of ordinary skill in the art would recognize many variations, alternatives, and modifications. Thus, the scope of the disclosure should be limited only by the following claims, and it is appropriate that the claims be construed broadly and in a manner consistent with the scope of the embodiments disclosed herein.

What is claimed is:

1. A computing device comprising:
a memory containing machine readable medium storing machine executable code; and
one or more processors coupled to the memory and configurable to execute the machine executable code to cause the one or more processors to:
receive filter criteria from a client device, the filter criteria specifying a condition for a set of first objects;
generate a first query specifying a first selection from the set of first objects based on the filter criteria, the first query being specific to a list-related view of the set of first objects;
cause a first result set of the first query to be displayed on the client device, the first result set being displayed using the list-related view; and
receive a request to switch from the list-related view to a calendar-related view, and in response:
determine a foreign key from a set of foreign keys for the set of first objects, the foreign key being a primary key for a set of second objects;
for a set of conditions specified in the filter criteria:
determine whether a respective condition references a second object of the set of second objects; and
update the filter criteria by replacing the respective condition with a first value in response to a determination that the respective condition does not reference the second object;

generate a second query specifying a second selection from the set of second objects based on the updated filter criteria, the second query being specific to the calendar-related view of the set of second objects; and cause a second result set of the second query to be displayed on the client device, the second result set being displayed using the calendar-related view.

2. The computing device of claim 1, wherein the machine executable code further causes the one or more processors to generate the second query by causing the one or more processors to:

execute the first query against a database; and
execute the second query against the database.

3. The computing device of claim 1, wherein the machine executable code further causes the one or more processors to generate the second query by causing the one or more processors to:

extract the filter criteria from the first query.

4. The computing device of claim 3, wherein the first value includes a Boolean value of true.

5. The computing device of claim 4, wherein the machine executable code further causes the one or more processors to generate the second query by causing the one or more processors to:

determine whether the set of conditions includes one or more Boolean values of true; and
update the filter criteria by simplifying the set of conditions in response to a determination that the set of conditions includes one or more Boolean values of true.

6. The computing device of claim 5, wherein the machine executable code further causes the one or more processors to generate the second query by causing the one or more processors to:

apply the updated filter criteria to the set of second objects, the second query specifying the second selection from the set of second objects using the updated filter criteria.

7. The computing device of claim 1, wherein the first result set is different from the second result set.

8. The computing device of claim 1, wherein the machine executable code further causes the one or more processors to determine the foreign key by causing the one or more processors to:

receive a context in which the filter criteria are entered into a user interface (UI) of the client device; and
determine, based on the context, the foreign key from the set of foreign keys.

9. The computing device of claim 1, wherein the machine executable code further causes the one or more processors to:

receive a request to switch from the calendar-related view to the list-related view, and in response:
generate the first query specifying the first selection from the set of first objects based on the filter criteria; and
display, on the client device, a third result set of the first query using the list-related view.

10. A method performed by one or more processors executing machine executable code, the method comprising:

receiving filter criteria from a client device, the filter criteria specifying a condition for a set of first objects;
generating a first query specifying a first selection from the set of first objects based on the filter criteria, the first query being specific to a list-related view of the set of first objects;
causing a first result set of the first query to be displayed on the client device, the first result set being displayed using the list-related view; and
receiving a request to switch from the list-related view to a calendar-related view, and in response:
determining a foreign key from a set of foreign keys for the set of first objects, the foreign key being a primary key for a set of second objects;
for a set of conditions specified in the filter criteria:
determining whether a respective condition references a second object of the set of second objects; and
updating the filter criteria by replacing the respective condition with a first value in response to a determination that the respective condition does not reference the second object;
generating a second query specifying a second selection from the set of second objects based on the updated filter criteria, the second query being specific to the calendar-related view of the set of second objects; and
causing a second result set of the second query to be displayed on the client device, the second result set being displayed using the calendar-related view.

11. The method of claim 10, further comprising:
executing the first query against a database; and
executing the second query against the database.

12. The method of claim 10, further comprising:
extracting the filter criteria from the first query.

13. The method of claim 12, wherein the first value includes a Boolean value of true in response to a determination that the respective condition does not reference the second object.

14. The method of claim 13, further comprising:
determining whether the set of conditions includes one or more Boolean values of true; and
updating the filter criteria by simplifying the set of conditions in response to a determination that the set of conditions includes one or more Boolean values of true.

15. The method of claim 14, further comprising:
applying the updated filter criteria to the set of second objects, the second query specifying the second selection from the set of second objects using the updated filter criteria.

16. The method of claim 10, wherein the first result set is different from the second result set.

17. The method of claim 10, further comprising:
receiving a context in which the filter criteria are entered into a user interface (UI) of the client device; and
determining, based on the context, the foreign key from the set of foreign keys.

18. A non-transitory machine-readable medium comprising executable code which when executed by one or more processors associated with a computing device are adapted to cause the one or more processors to perform a method comprising:

receiving filter criteria from a client device, the filter criteria specifying a condition for a set of first objects;
generating a first query specifying a first selection from the set of first objects based on the filter criteria, the first query being specific to a list-related view of the set of first objects;
causing a first result set of the first query to be displayed on the client device, the first result set being displayed using the list-related view; and
receiving a request to switch from the list-related view to a calendar-related view, and in response:

determining a foreign key from a set of foreign keys for the set of first objects, the foreign key being a primary key for a set of second objects;

for a set of conditions specified in the filter criteria:
determining whether a respective condition references a second object of the set of second objects; and updating the filter criteria by replacing the respective condition with a first value in response to a determination that the respective condition does not reference the second object;

generating a second query specifying a second selection from the set of second objects based on the filter criteria, the second query being specific to the calendar-related view of the set of second objects; and causing a second result set of the second query to be displayed on the client device, the second result set being displayed using the calendar-related view.

19. The non-transitory machine-readable medium of claim 18, the method further comprising:
extracting the filter criteria from the first query, wherein the first value includes a Boolean value of true.

20. The non-transitory machine-readable medium of claim 19, the method further comprising:
determining whether the set of conditions includes one or more Boolean values of true;

updating the filter criteria by simplifying the set of conditions in response to a determination that the set of conditions includes one or more Boolean values of true; and applying the updated filter criteria to the set of second objects, the second query specifying the second selection from the set of second objects using the updated filter criteria.

* * * * *